(12) United States Patent
Goiti Ugarte et al.

(10) Patent No.: US 11,919,776 B2
(45) Date of Patent: Mar. 5, 2024

(54) PROCESS FOR PREPARING WATERGLASS-BASED SILICA AEROGELS AND PRODUCTS THEREOF

(71) Applicant: FUNDACIÓN TECNALIA RESEARCH & INNOVATION, Derio-Bizkaia (ES)

(72) Inventors: Eunate Goiti Ugarte, Derio-Bizkaia (ES); Marta Ocejo Lopez de Guereña, Derio-Bizkaia (ES)

(73) Assignee: FUNDACIÓN TECNALIA RESEARCH & INNOVATION, Derio-Bizkaia (ES)

( * ) Notice: Subject to any disclaimer, the term of this patent is extended or adjusted under 35 U.S.C. 154(b) by 343 days.

(21) Appl. No.: 17/128,777

(22) Filed: Dec. 21, 2020

(65) Prior Publication Data

US 2021/0230007 A1 Jul. 29, 2021

(30) Foreign Application Priority Data

Dec. 23, 2019 (EP) ..................................... 19383187

(51) Int. Cl.
*C01B 33/158* (2006.01)
*C01B 33/145* (2006.01)
*C01B 33/152* (2006.01)

(52) U.S. Cl.
CPC ........ *C01B 33/1585* (2013.01); *C01B 33/145* (2013.01); *C01B 33/152* (2013.01); *C01P 2002/82* (2013.01); *C01P 2002/86* (2013.01); *C01P 2004/03* (2013.01); *C01P 2006/10* (2013.01)

(58) Field of Classification Search
CPC . C01B 33/1585; C01B 33/145; C01B 33/152; C01P 2006/10
See application file for complete search history.

(56) References Cited

PUBLICATIONS

Bhagat et al (Rapid synthesis of water-glass based aerogels by in situ surface modification of the hydrogels, Applied Surface Science, 2007) (Year: 2007).*
Cui et al (Preparation and Adsorption Capacity of Vinyltriethoxysilane, Current Nanoscience, 2012) (Year: 2012).*

(Continued)

*Primary Examiner* — Colin W. Slifka
*Assistant Examiner* — Logan Edward Laclair
(74) *Attorney, Agent, or Firm* — Seed IP Law Group LLP

(57) ABSTRACT

The present invention relates to a process for preparing waterglass-based silica aerogels, wherein the process comprises (a) subjecting a certain amount of a vinyltrialcoxysilane to hydrolysis in the presence of water and an inorganic acid under stirring conditions to produce a hydrolyzed vinyltrialcoxysilane solution; (b) treating a waterglass solution with an acidic cationic-exchange resin to produce a silicic acid solution; (c) forming a sol phase by contacting the hydrolyzed vinylalcoxysilane solution with the silicic acid solution; (d) forming a gel phase by adjusting the pH of the sol phase to a value in the range of from 4 to 6; and (e) subjecting the gel phase to supercritical drying to produce an aerogel. The present invention is also related to waterglass-based silica aerogels obtained by the process according to the invention, which are functionalized with vinyl groups.

10 Claims, 7 Drawing Sheets

1(a)

1(b)

(56) References Cited

PUBLICATIONS

Maleki et al (Synthesis of mechanically reinforced silica aerogels via surface-initiated reversible addition-fragmentation chain transfer (RAFT) polymerization, Royal Society of Chemistry, 2014) (Year: 2014).*

Borda et al., "Spectroscopic Characterization of Silica Aerogels Prepared Using Several Precursors—Effect on the Formation of Molecular Clusters," *New J. Chem.* 41:6742-6759, 2017.

Cui et al., "Preparation and Adsorption Capacity of Vinyltriethoxysilane Modified Silica Aerogels," *Current Nanoscience* 8(5):797-800, 2012.

Huang et al., "Amino-terminated SiO2 aerogel towards highly-effective lead (II) adsorbent via the ambient drying process," *Journal of Non-Crystalline Solids* 443:39-46, 2016.

Loy et al., "Substituent Effects on the Sol-Gel Chemistry of Organotrialkoxysilanes," *Chem. Matter* 12(12):3624-3632, 2000.

Ma et al., "Large size and low density SiOC aerogel monolith prepared from triethoxyvinylsilane/tetraethoxysilane," *Ceramics International* 43:5774-5780, 2017.

Rao et al., "Hydrophobic and physical properties of the ambient pressure dried silica aerogels with sodium silicate precursor using various surface modification agents," *Applied Surface Science* 253:6032-6040, 2007.

Saad et al., "Surface-functionalized silica aerogels and alcogels for methylene blue adsorption," *RSC Advances* 5:6111-6122, 2015.

Sarawade et al., "High specific surface area TEOS-based aerogels with large pore volume prepared at an ambient pressure," *Applied Surface Science* 254:574-579, 2007.

Yang et al., "Hyperelastic and hydrophobic silica aerogels with enhanced compressive strength by using VTES/MTMS as precursors," *Journal of Non-Crystalline Solids* 5325:119677, 2019 (8 Pages).

Zu et al., "Versatile Double-Cross-Linking Approach to Transparent, Machinable, Supercompressible, Highly Bendable Aerogel Thermal Superinsulators," *Chem. Mater.* 30:2759-2770, 2018.

* cited by examiner

3(a)

3(b)

PROCESS FOR PREPARING WATERGLASS-BASED SILICA AEROGELS AND PRODUCTS THEREOF

TECHNICAL FIELD OF THE INVENTION

The present invention relates to the field of waterglass-based silica aerogels, in particular, to a process for preparing waterglass-based silica aerogels which are functionalized with vinyl groups, said process being suitable for industrial applications. In another aspect, a particular type of waterglass-based silica aerogels which are obtained according to the process are provided, whose silica network is functionalized with vinyl groups. The process of the invention further allows the subsequent functionalization of the produced aerogels with vinyl monomers such as styrene, thus producing advanced aerogel materials which may provide new functionalities and properties.

BACKGROUND OF THE INVENTION

Organic modification of aerogels is generally carried out either by a surface modification, once the silica gel is formed, or by a method known as the co-precursor method.

The surface modification method is based on a two-step process: in a first step, the gel is formed (sol-gel reaction) and in a second step, the surface modification takes place. This method has been widely applied for alkoxysilane-based aerogels (*Applied Surface Science* 2007, 254, 574-579) which are typically based on tetraethoxysilane (TEOS), and also for waterglass-based silica aerogels (*Journal of Non-Crystalline Solids* 2016, 443, 39-46).

On the other hand, the co-precursor method is based on a single-step process. In the case of alkoxysilanes precursors such as TEOS, they are mixed with a co-precursor (e.g. an organoalkoxysilane such as trimethoxymethylsilane, known as MTMS). Generally, an alcohol is used as mutual solvent, together with water, in the sol-gel process due to the low or null solubility of organoalkoxysilanes in water. In addition, the water content is limited to prevent phase separation between water and the organoalkoxysilane.

However, in the case of waterglass (i.e. sodium silicate aqueous solution) as main precursor of silica in the gel, the solvent employed is necessarily water, so the use of organoalkoxysilanes in the co-precursor strategy is uncommon. Furthermore, additional difficulties are envisaged when the organoalkoxysilane co-precursor of choice must be hydrolyzed in water due to its limited solubility therein, and also when condensation must take place to form the hybrid organic-inorganic gel phase. Such difficulty also applies when trying to introduce a functionalization such as the vinyl group in the silica network.

There are few examples in literature that show how the co-precursor method can be applied to aerogels prepared by mixing waterglass with a co-precursor, and in general they are limited to methyltrimethoxysilane (MTMS) or methyltriethoxysilane (MTES) as co-precursors.

It is worth noting that reaction kinetics of organoalkoxysilanes are slower than those of tetraalkoxysilanes, due mainly to the inductive effect of the organic groups present in the organoalkoxysilane (*Applied Surface Science* 2007, 254, 574-579). On the other hand, the nature and size of the organic group of the organoalkoxysilanes determine the hydrolysis-condensation kinetics observing differences in gelation times as well as on the final properties of the resultant gels. Steric effects might also affect pore sizes and surface area of the resulting aerogel, as disclosed by Cui et al. (*Current Nanoscience* 2012, 8, 797-800). Cui et al. disclosed a method for preparing silica-based aerogels based on the use of tetraethoxysilane (TEOS) and triethoxyvinylsilane (TEVS) as co-precursors. Accordingly, both co-precursors were mixed together and then hydrolyzed. However, the differences in the hydrolysis and condensation between TEOS and TEVS, due to the induction effect of the non-hydrolyzed vinyl groups, led to an initial formation of silica network resulting from the hydrolysis and condensation of TEOS and a later modification of the silica network from hydrolyzed TEVS. As a result, the properties of the resultant aerogels were significantly affected, and lower surface areas, pore volumes and pore sizes were obtained compared to TEOS-based silica aerogels with no TEVS functionalization.

Other attempts at preparing TEVS-functionalized TEOS-based silica aerogels have been recently published, wherein a significant increase in gelation time was observed due to the steric effects of TEVS, thus also making these options difficult to use at industrial scale. Cui et al. also showed that as the content of TEVS was increased, the gelation times were also increased. By way of illustration, they showed that when a TEVS/TEOS molar ratio of 0.5 was used, the gelation time increased up to more than 40 hours.

Therefore, there is a dire need in the field of aerogel synthesis for finding new synthetic methods for preparing silica-based aerogels which allow for the efficient use of waterglass precursors, since they are to date the most cost-efficient precursors, while at the same time they make it possible to prepare functionalized waterglass-based silica aerogels, in particular with vinylalcoxysilanes, without significantly altering the properties of the original waterglass-based aerogel tridimensional structure.

SUMMARY OF THE INVENTION

According to one aspect of the present invention, it is provided a process for preparing waterglass-based silica aerogels which comprises:
(a) subjecting a certain amount of a vinyltrialcoxysilane to hydrolysis in the presence of water and an inorganic acid and under stirring conditions to produce a hydrolyzed vinyltrialcoxysilane solution;
(b) treating a waterglass solution with an acidic cationic-exchange resin to produce a silicic acid solution;
(c) forming a sol phase by contacting the hydrolyzed vinyltrialcoxysilane solution with the silicic acid solution;
(d) forming a gel phase by adjusting the pH of the sol phase to a value in the range of from 4 to 6; and
(e) subjecting the gel phase to supercritical drying to produce an aerogel.

In this regard, it has been surprisingly found by the inventors that this process advantageously allows the formation of a modified $SiO_2$ gel phase in one step, that is, the gel formation and its modification with vinyl groups are carried out simultaneously, without significantly altering the waterglass-based silica aerogel properties. Such technical effects provided by the present invention are particularly advantageous compared to existing derivatization methods, wherein a plain silica-based gel is formed first and later modified, with the detrimental effects this sequential formation entails, as disclosed in Cui et al.

Furthermore, the process of the present invention allows the use of waterglass as starting material for the production of SiO$_2$ aerogels, which is much more cost-effective than other commonly used precursors such as tetraethoxysilane (TEOS).

In another aspect, waterglass-based silica aerogels obtained or obtainable according to the process of the invention, in particular vinyltrialcoxysilane-functionalized waterglass-based silica aerogels, are also provided.

In this regard, it has also been surprisingly found by the inventors that shorter gelation times were obtained with the TEVS-functionalized waterglass-based silica aerogels obtained according to the process of the invention, compared to known waterglass-based silica aerogels functionalized with other silicon alcoxides such as TEOS.

(b)—$^{29}$Si NMR spectrum of a reference TEOS-based silica aerogel (reference TEOS aerogel), including an expanded view of the relevant chemical shift range);

(c)—$^{29}$Si NMR spectrum of TEVS-functionalized waterglass-based silica aerogel (TEVS-WG aerogel) prepared according to the process of the invention;

(d)—$^{13}$C NMR spectrum of a TEVS-functionalized waterglass-based silica aerogel (TEVS-WG aerogel) prepared according to the process of the invention.

Figure 2:
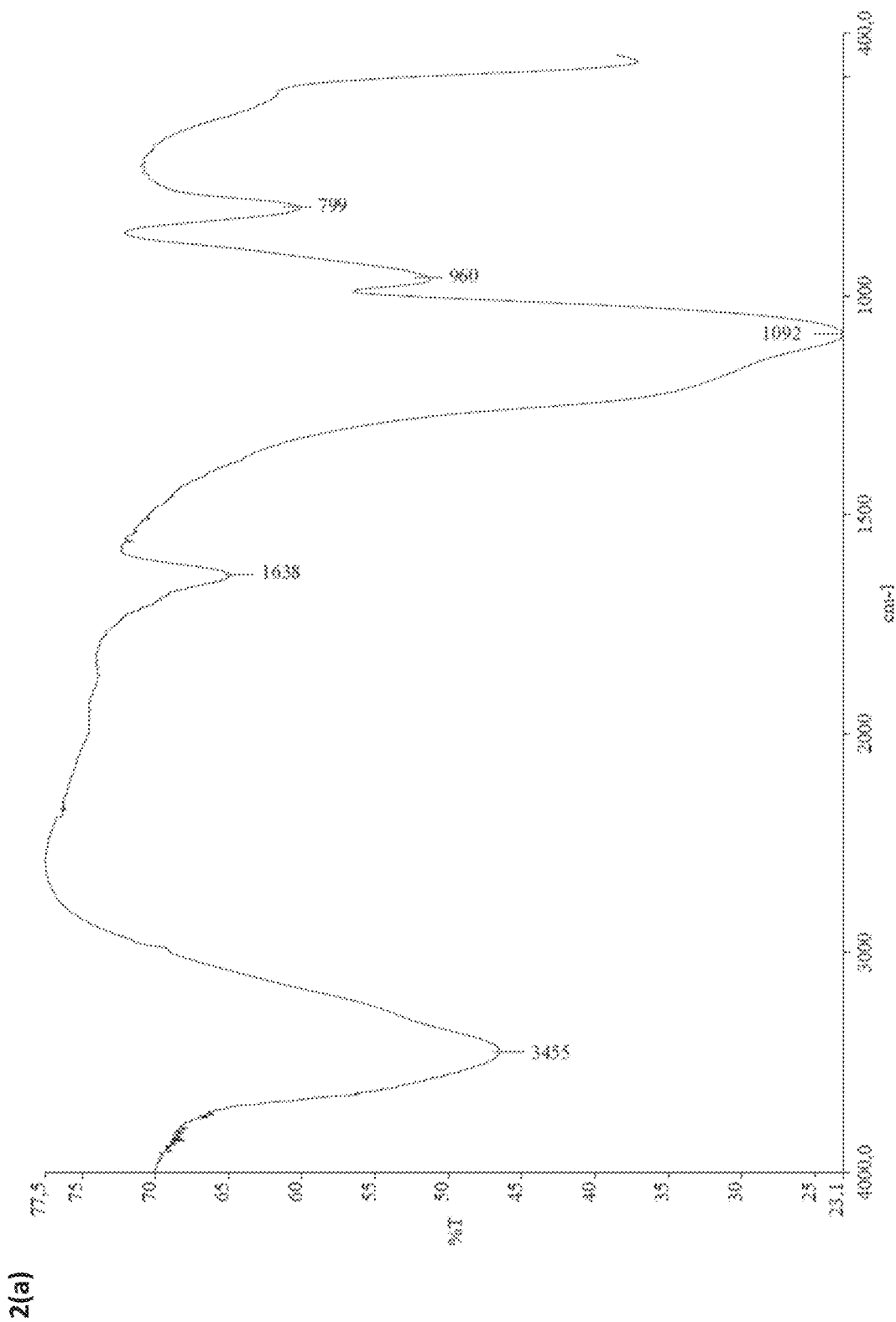
Figure 2:
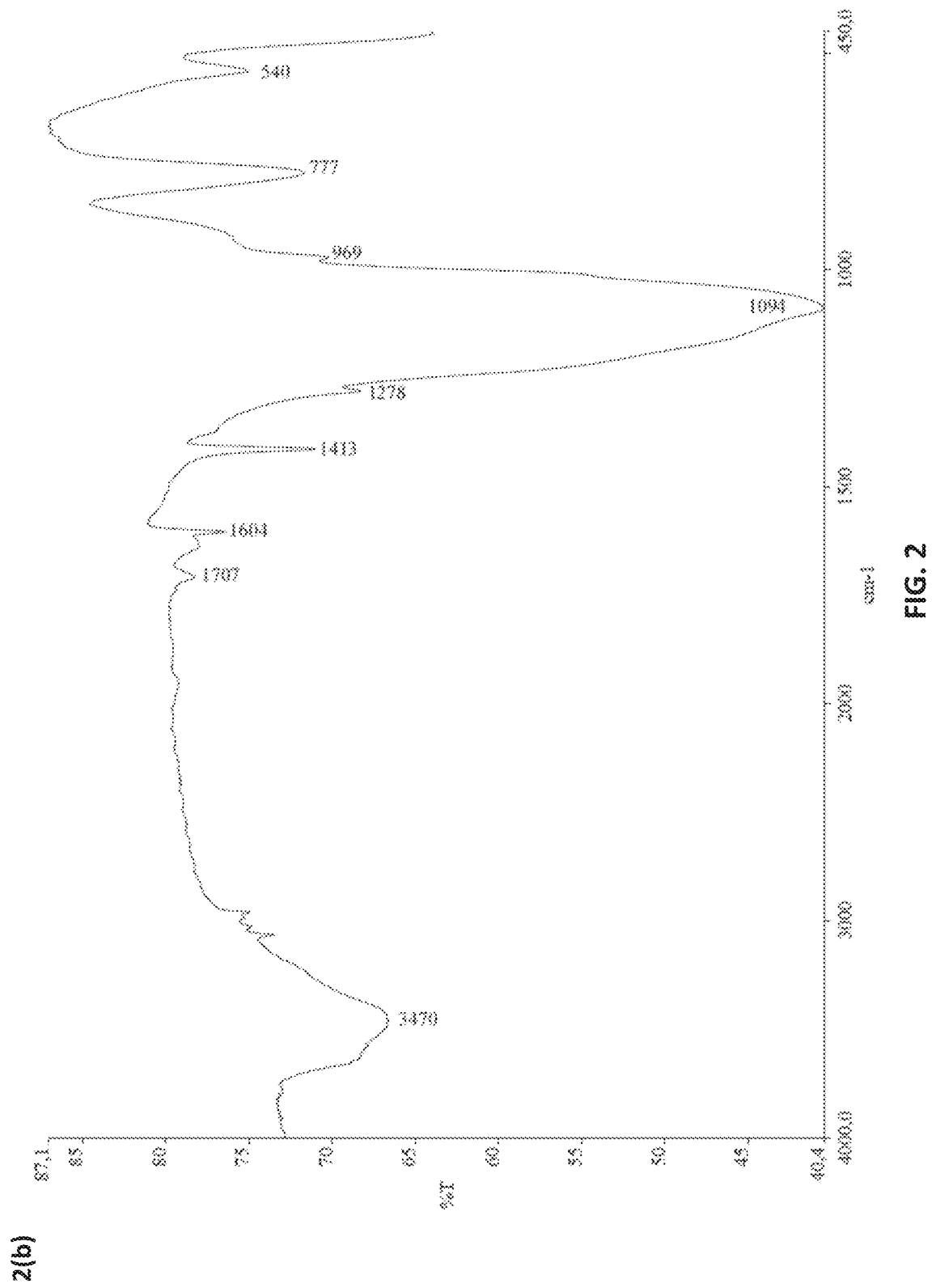

FIG. 2: (a)—FT-IR spectrum of a reference waterglass-based silica aerogel (reference WG aerogel);

(b)—FT-IR spectrum of a TEVS-functionalized waterglass-based silica aerogel (TEVS-WG aerogel) prepared according to the process of the invention.

Figure 3:
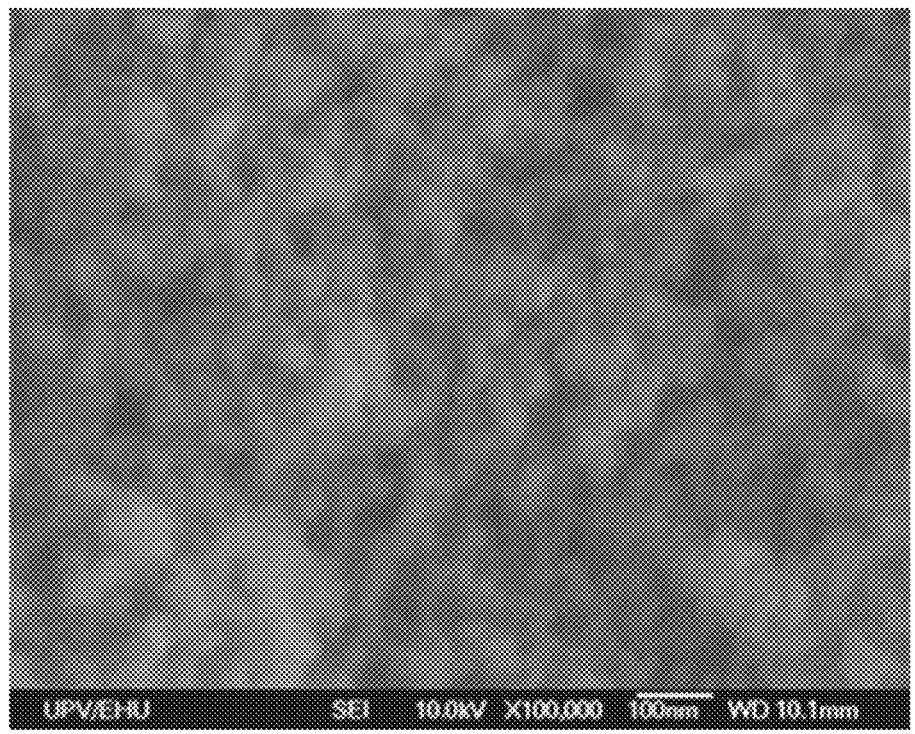
Figure 3:
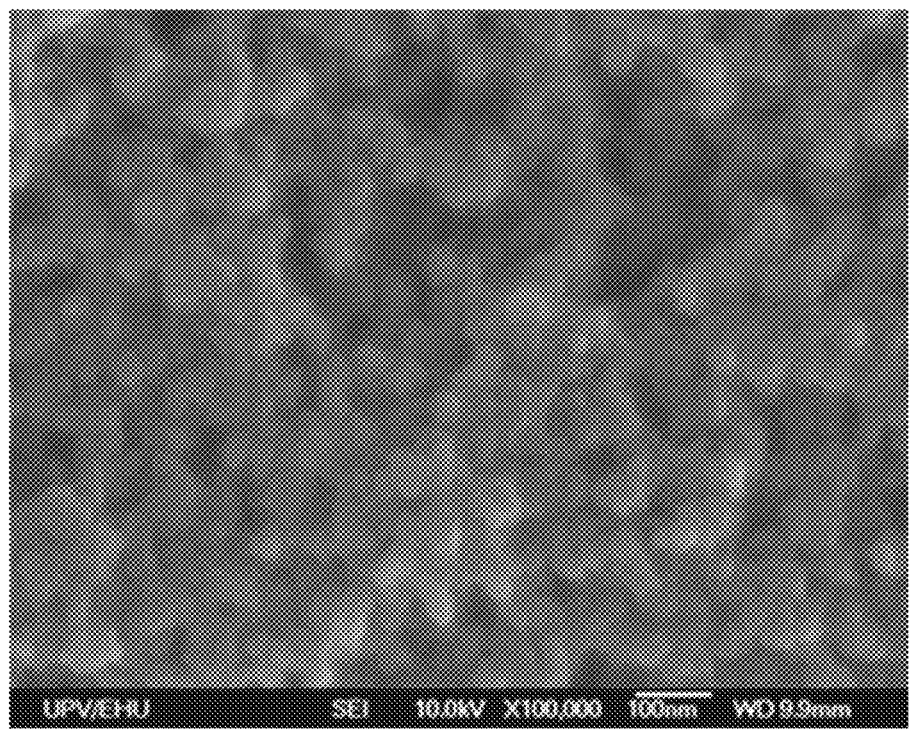

FIG. 3: (a)—SEM image of a reference waterglass-based silica aerogel (reference WG aerogel);

(b)—SEM image of a TEVS-functionalized waterglass-based silica aerogel (TEVS-WG aerogel) prepared according to the process of the invention.

DETAILED DESCRIPTION OF THE INVENTION

It is one object of the present invention to provide a process by which water-glass based silica aerogels suitable for industrial applications can be easily produced. Such process for preparing waterglass-based silica aerogels comprises:

(a) subjecting a certain amount of a vinyltrialcoxysilane to hydrolysis in the presence of water and an inorganic acid under stirring conditions to produce a hydrolyzed vinyltrialcoxysilane solution;

(b) treating a waterglass solution with an acidic cationic-exchange resin to produce a silicic acid solution;

(c) forming a sol phase by contacting the hydrolyzed vinyltrialcoxysilane solution with the silicic acid solution;

(d) forming a gel phase by adjusting the pH of the sol phase to a value in the range of from 4 to 6; and (e) subjecting the gel phase to supercritical drying to produce an aerogel.

In step (a), the vinyltrialcoxysilane compound is usually added dropwise in the presence of water and the inorganic acid, and under stirring conditions to produce the hydrolyzed vinyltrialcoxysilane solution.

Furthermore, according to one preferred embodiment, step (a) may be carried out by first adding the vinylalcoxysilane over water, preferably distilled water, and then adding the inorganic acid. In another embodiment, step (a) may be carried out by first adding the inorganic acid to water, preferably distilled water, and then adding the vinylalcoxysilane over the mixture of water and the inorganic acid. Still in another embodiment, step (a) may be carried out by first adding a first amount of the inorganic acid to water, preferably distilled water, then adding the vinylalcoxysilane over the mixture of water and the first amount of inorganic acid, and subsequently adding a second amount of the inorganic acid to the previous mixture of water, the first amount of inorganic acid and the vinylalcoxysilane.

High-speed stirring conditions are necessary in step (a) to ensure that the vinylalcoxysilane hydrolylisis is carried out in emulsion, with no phase separation, and with smaller particle sizes of the precursor, so that a faster and more effective hydrolysis can be achieved. Thus, stirring conditions employed in step (a) of the process of the invention preferably comprise a stirring speed in the range of from 250 to 1000 rpm, more preferably a stirring speed in the range of from 280 to 900 rpm, still more preferably, a stirring speed in the range of from 300 to 800 rpm. It will be apparent for the skilled person that the selection of a specific stirring speed within these ranges may be easily made depending on the total volume of solvent employed. Besides, it has been observed that when vinylalcoxysilane hydrolysis proceeds to completion, the emulsion is eventually transformed into a solution.

The rapid mixing of the ingredients under stirring conditions may take place in any suitable device known to the person skilled in the art, such as, for example, stirred kettles, mixing nozzles and static mixers.

The inorganic acid used in step (a) may be any inorganic acid or mixture of inorganic acids with a large dissociation constant value (Ka), which will act as catalyst in the vinylalcoxysilane hydrolysis reaction. Preferably, the inorganic acid used in step (a) is selected from the group consisting of sulphuric acid, phosphoric acid, nitric acid, hydrofluoric acid, hydrochloric acid and any mixture thereof. Preferably, the inorganic acid is selected from the group consisting of sulphuric acid, phosphoric acid, nitric acid, hydrochloric acid and any mixture thereof. More preferably, the inorganic acid is selected from the group consisting of sulphuric acid, nitric acid, hydrochloric acid and any mixture thereof.

The waterglass solution employed in step (b) of the process of the invention is preferably a waterglass aqueous solution comprising a 9% to 25% by weight solution of sodium and/or potassium waterglass.

In order to efficiently convert the waterglass solution into a silicic acid aqueous solution, an acidic cationic-exchange resin is necessary in step (b) of the process of the invention. In this regard, strongly acidic cation-exchange resins are preferably used, which can be gel-type resins or macroreticular resins. Preferred acidic cation-exchange resins in the context of the invention are typically those having either a poly(styrene-divinylbenzene) matrix functionalized with sulfonic acid groups (hydrogen form or H-form) in the styrene frame, or a poly(styrene-divinylbenzene) matrix functionalized with sulfonate groups (sodium form or Na-form) in the styrene frame. Specific examples of suitable acidic cationic-exchange resins include, but are not limited to, Amberlite® IR120 H in hydrogen form (CAS Nr. 39389-20-3); Duolite® C20 in sodium form (CAS Nr. 37265-12-6); and DIAION™ SK104 in either hydrogen or sodium form.

In step (c) of the process of the invention, a sol phase is formed after contacting the hydrolyzed vinylalcoxysilane solution with the silicic acid solution, preferably at room temperature. As a result of such contacting, such sol phase of step (c) comprises a certain amount of silica resulting from the vinylalcoxysilane hydrolysis (formed step (a) of the process) and a certain amount of silica resulting from the silicic acid solution (formed in step (b) of the process).

According to a preferred embodiment, the sol phase in step (c) comprises an amount by weight of silica resulting from the silicic acid solution which is higher than the amount by weight of silica resulting from the vinylalcoxysilane hydrolysis. In another preferred embodiment, the sol phase in step (c) comprises an amount by weight of silica resulting from the silicic acid solution which is at 1.5 times higher than the amount by weight of silica resulting from the vinylalcoxysilane hydrolysis. In another preferred embodiment, the sol phase in step (c) comprises an amount by weight of silica resulting from the silicic acid solution which is at least two times higher than the amount by weight of silica resulting from the vinylalcoxysilane hydrolysis. In still another preferred embodiment, the sol phase in step (c) comprises about 6% by weight of silica resulting from the silicic acid solution and about 3% by weight of silica resulting from the vinylalcoxysilane hydrolysis. It will become apparent for those skilled in the art that the amount by weight of silica in step (c) resulting from each one of the two solutions from either the vinylacoxysilane hydrolysis or the silicic acid solution can be easily adjusted by modifying the initial amounts of vinylalcoxysilane and waterglass solution initially used in steps (a) and (b), respectively.

The term "about" when used in the context of the present invention preceding a number and referring to it, is to be understood as designating any value lying within the range defined by the number ±5%, more preferably a range defined by the number ±2%. For example, the expression "about 10" should be construed as "within the range of 9.5 to 10.5", preferably "within the range of 9.8 to 10.2".

In step (d), a modified silica gel is formed in a single step wherein gelation and modification of the silica gel being formed with vinyl groups take place simultaneously. As already discussed above, this is one of the particularly advantageous aspects of the process of the invention compared to conventional derivatization methods which involve the formation of a plain silica-based gel which is later modified.

The gelation reaction which takes place in step (d) preferably takes place under pH conditions in the range of from 4.0 to 6.0, more preferably under pH conditions in the range of from 4.0 to 5.5, in order to avoid excessively long or short gelation times which would be detrimental for the final properties of the resulting aerogel. Therefore, according to a preferred embodiment, the pH of the sol phase in gelation step (d) of the process is adjusted to a value in the range of from 4 to 6, preferably a value in the range of from 4.0 to 5.5, with a base such as $NH_4OH$.

The process according to the invention may include a further step taking place after step (d) and prior to step (e), wherein the resulting gel from step (d) is aged. Such aging contributes to strengthen the silica network, and may be carried out in the presence of water for a period equal to or higher than 24 hours at a temperature in the range of from 50 to 70° C. Preferably, the aging period is in the range of from 24 to 72 hours, more preferably in the range of from 24 to 48 hours, still more preferably in the range of from 24 to 36 hours, and still even more preferably the aging period is of about 24 hours. Preferred aging temperature ranges include 50-70° C., more preferably the range of from 55 to 65° C., and more preferably at a temperature of about 60° C.

In a particularly preferred embodiment, the aging step is carried out in the presence of water for a period in the range of from 24 to 72 hours at a temperature in the range of from 50 to 70° C. More preferably, the aging step is carried out in the presence of water for a period in the range of from 24 to 36 hours at a temperature in the range of from 55 to 65° C. Still more preferably, the aging step is carried out in the presence of water for about 24 hours at a temperature of about 60° C.

When this aging step takes place, the gel may be preferably washed with water before and/or after aging, particularly preferably until the wash water used is free of electrolytes. Mixtures of water and another solvent(s) (e.g. aliphatic alcohols, ethers, esters, ketones and aliphatic or aromatic hydrocarbons) may be used for such washing step, on condition that the water content is sufficiently high to ensure that salts in the pores of the gel do not crystallize out.

Before supercritical drying of the gel phase of step (e) takes place, the aqueous solvent may be exchanged with an organic solvent. Solvent exchange may be carried out one or more times. In those embodiments of the process according to the invention wherein an ageing step takes place after step (d), such ageing will be preferably carried out before exchanging the aqueous solvent with the organic solvent. The organic solvent is preferably an alcohol, more preferably a C1-C4 alcohol (e.g. methanol, ethanol, propanol, isopropanol or butanol), still more preferably methanol or ethanol, and still even more preferably the organic solvent is ethanol.

Solvent exchange is particularly advantageous when the gel drying is carried out in supercritical $CO_2$, since water is not soluble in liquid carbon dioxide, so it would not properly diffuse inside the pores if water was present. Therefore, when supercritical $CO_2$ is to be employed, exchange of the aqueous solvent used in the gel synthesis with a water-free solvent will be preferably used.

Supercritical drying of the gel phase in step (e) of the process of the invention is preferably carried out at a temperature in the range of from 31 to 70° C., more preferably at a temperature in the range of from 35 to 50° C. Pressure conditions used in step (e) are advantageously in the range of from 100 to 200 bars. In a particularly preferred embodiment, the supercritical drying in step (e) of the process of the invention is carried out at a temperature in the range of from 35 to 50° C. and under pressure conditions in the range of from 100 to 200 bars.

Use of liquid $CO_2$ is particularly preferred for carrying out supercritical drying step (e). In a particularly preferred embodiment, the gel phase is soaked in the organic solvent and then placed in a reactor, wherein the organic solvent is replaced with $CO_2$. Temperature and pressure conditions are then adjusted accordingly so that supercritical conditions are reached, and then maintained for an amount of time sufficient for the $CO_2$ to replace the organic solvent present in the pores by diffusion. Drying in step (e) is usually continued until the gel has a residual content of less than 0.1% by weight of solvent. Drying rate is usually monitored and controlled by measuring the amount of organic solvent that is extracted during the drying step.

The process of the invention may advantageously comprise a further step after drying step (e), wherein the resulting aerogel from step (e) is functionalized through a reaction with a vinyl monomer such as styrene. Since vinyl moieties are highly reactive, they can easily be subject to polymerization reactions, so that the aerogels obtained according to the process of the invention may be further modified to provide new functionalities and properties.

In particular, such subsequent functionalization is particularly interesting for the production of advanced aerogel materials in which an advantage may be taken from their thermal and acoustic properties, for example, as thermal and/or acoustic insulation elements, thus making them particularly suitable for applications in the building sector, the aeronautic sector or in refrigeration systems.

Furthermore, the resulting aerogel from step (e) may also be functionalized with other organic monomers to produce hybrid aerogels with novel properties and functionalities.

Another object of the invention is the provision of waterglass-based silica aerogels which are obtainable or obtained by the process of the invention, which are advantageously functionalized with vinyl groups.

The waterglass-based silica aerogels obtainable or obtained according to the process of the invention preferably have a porosity in the range of from 93 to 95%. In a preferred embodiment, these waterglass-based silica aerogels have a density in the range of from 0.09 to 0.15 g/cm$^3$. Still in another preferred embodiment, the waterglass-based silica aerogels obtainable or obtained according to the process of the invention preferably have a porosity in the range of from 93 to 95% and a density in the range of from 0.09 to 0.15 g/cm$^3$.

The waterglass-based silica aerogels obtainable or obtained according to the process of the invention may be advantageously functionalized through a reaction with a vinyl monomer such as styrene to produce advanced functionalized waterglass-based silica aerogels.

Throughout the description and the claims, the word "comprise", "contain" and variations thereof are not intended to exclude other technical features, ingredients or steps. Additional advantages and features of the invention will become apparent to those skilled in the art upon examination of the description or may be learned by practice of the invention without undue burden.

EXAMPLES

The following examples are provided by way of illustration and shall not be construed as limiting the invention:

Example 1—Exemplary Synthesis of a Waterglass-Based Silica Aerogel (TEVS-Functionalized Waterglass-Based Silica Aerogel) According to the Process of the Invention 12.74 g of triethoxyvinylsilane was added dropwise over 76.01 g of distilled water under vigorous stirring, and 0.225 ml of HCl 0.1 M was added as catalyst. The resulting solution was kept at room temperature under a constant stirring for 18 h, so that TEVS hydrolysis could proceed to completion.

100 ml of a waterglass solution (with a 9 wt % SiO$_2$ concentration) was treated with 150 ml of the ionic-exchange Amberlite® IR120 H resin, thus providing a silicic acid aqueous solution with a 9 wt % SiO$_2$ concentration;

37.29 g of the resulting hydrolyzed TEVS solution was added dropwise over 83.33 g of the silicic acid aqueous solution to form a sol phase; to this sol phase, 4.38 g of water were added.

The pH value of the resulting sol phase, which was 1.8, was adjusted with a 0.5M NH$_4$OH solution up to a pH value of 4.5 to form a gel, and the resulting gel was aged in the presence of water at 60° C. during 24 hours to strengthen the silica network.

Solvent exchange with ethanol was then performed 4 times, and the resultant gel phase was dried under CO$_2$ supercritical conditions (50° C. and 130 bars), thus leading to the formation of an aerogel final product.

The resulting TEVS-functionalized waterglass-based silica aerogel (hereinafter referred to as TEVS-WG aerogel) was characterized by nuclear magnetic resonance (NMR), Fourier-transform infrared spectroscopy (FTIR) and field emission gun scanning electron microscopy (FEG-SEM).

Nuclear Magnetic Resonance ($^{29}$Si CPMAS NMR and $^{13}$C NMR)

TEVS-WG aerogel prepared according to the process of the invention was characterized by nuclear magnetic resonance.

Solid $^{29}$Si CPMAS (cross-polarization magic angle spinning) NMR spectra of the aerogels were obtained by using a Bruker Avance III 400 MHz spectrometer equipped with a MAS/DVT 4 mm probe with cross-polarization and magic angle spinning at 10 KHz.

$^{13}$C CPMAS NMR spectra were recorded on a 400 MHz BRUKER system equipped with a 4 mm MAS DVT TRIPLE Resonance HYX probe with 100 mg of material. Larmor frequencies were 400.17 MHz and 100.63 MHz for $^1$H and $^{13}$C nuclei, respectively. Chemical shifts were reported relative to the signals of $^{13}$C nuclei in glycin. Sample rotation frequency was 12 kHz and recovery delay period was of 5 seconds. The number of scans were 2048. Polarization transfer was achieved with RAMP cross-polarization (ramp on the proton channel) with a contact time of 5 milliseconds. High-Power SPINAL 64 heteronuclear proton decoupling was applied during acquisition.

Figure 1:
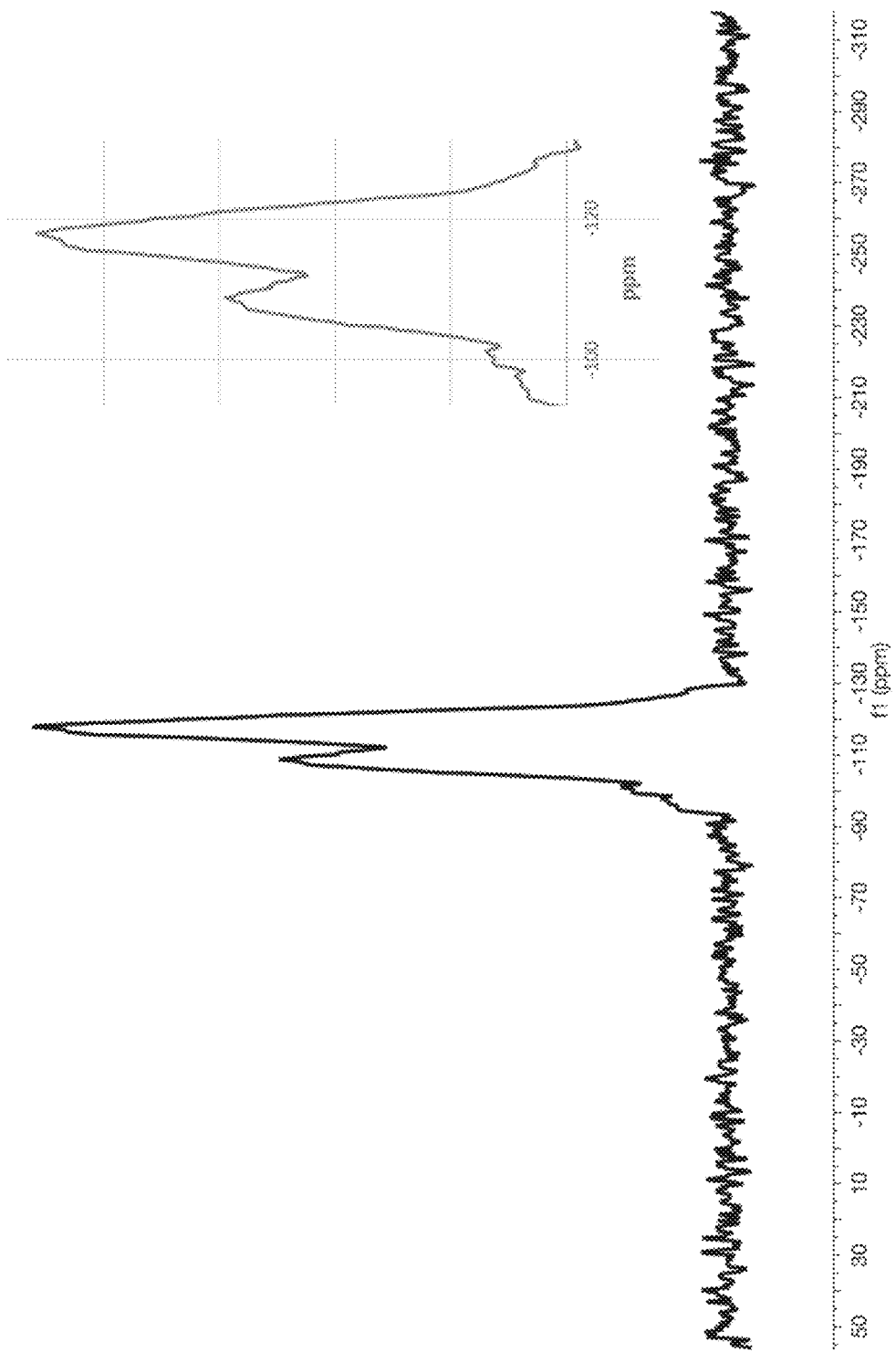
FIG. 1: (a)—$^{29}$Si NMR spectrum of a reference waterglass-based silica aerogel (reference WG aerogel), including an expanded view of the relevant chemical shift range)
Figure 1:
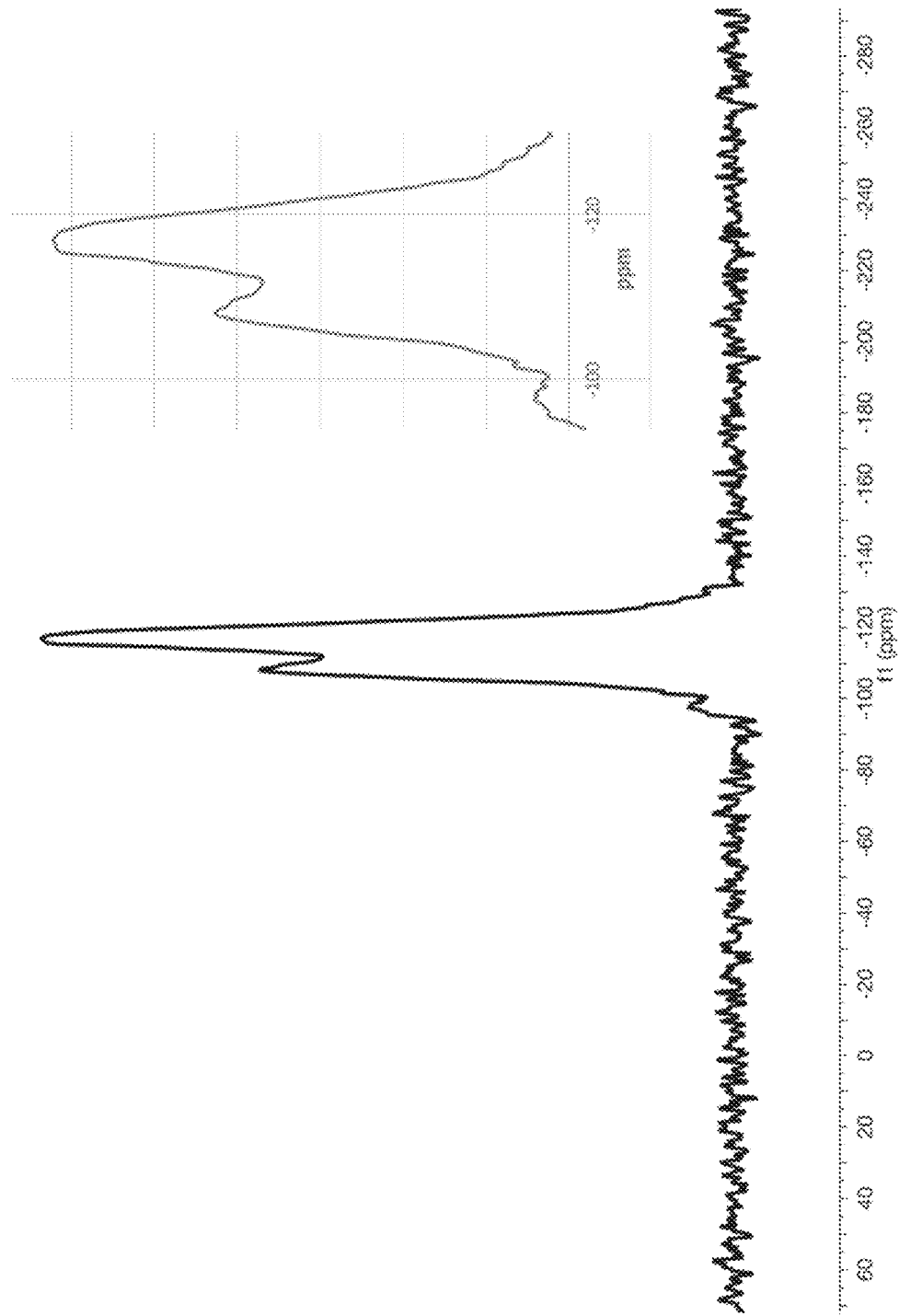
Figure 1:
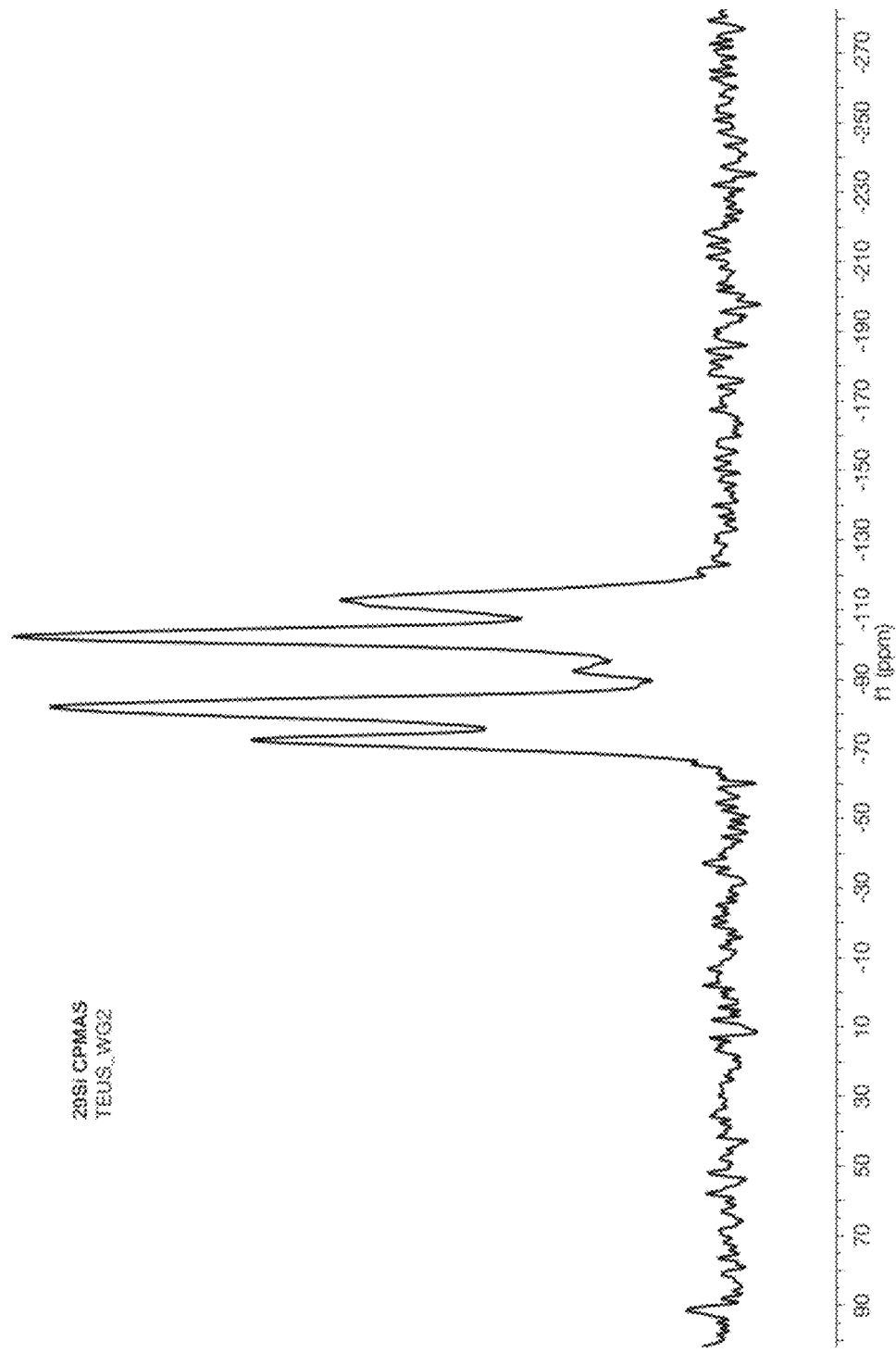
Figure 1:
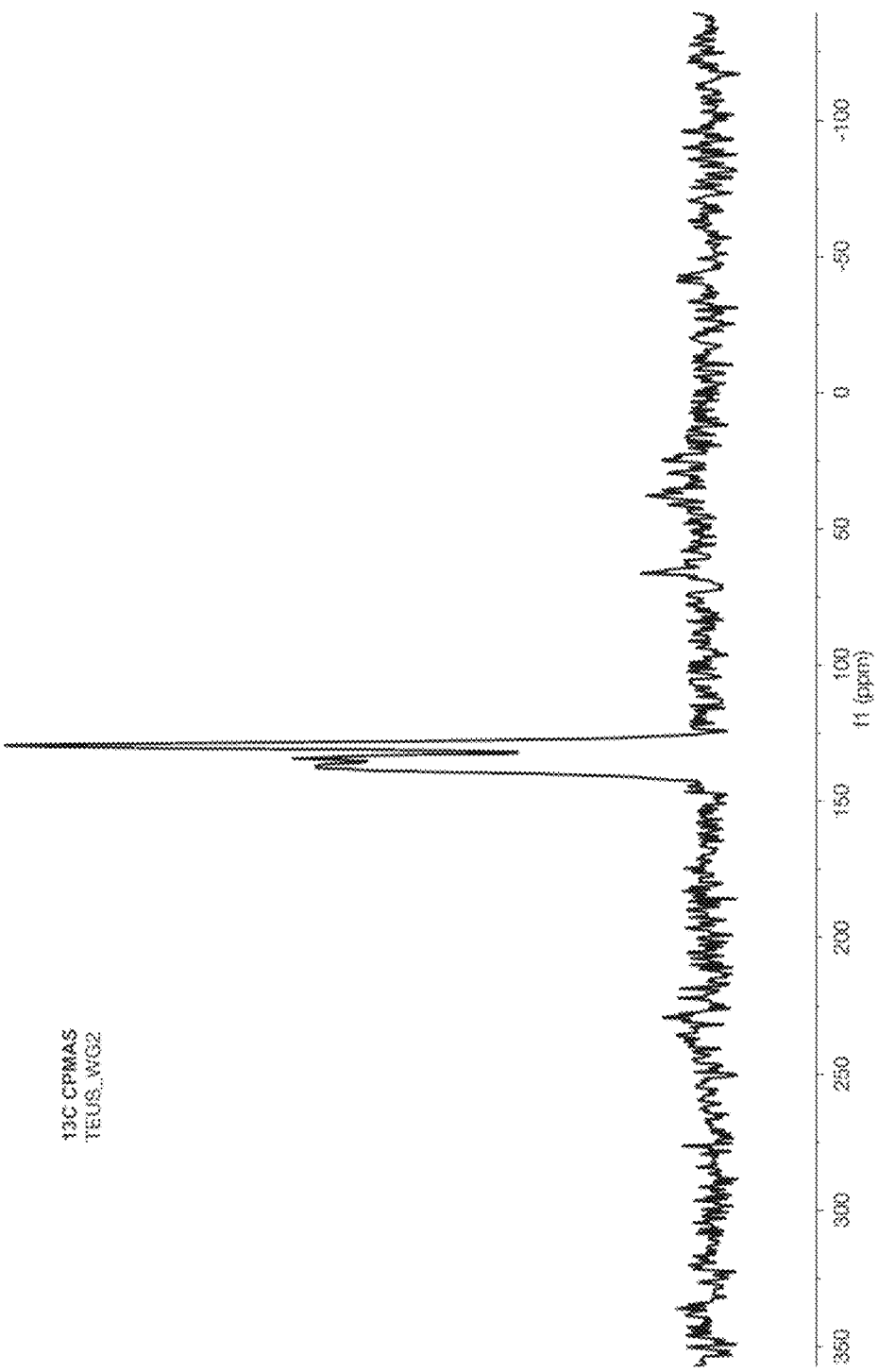

Both $^{29}$Si- and $^{13}$C-NMR spectra of the TEVS-WG aerogel (FIGS. 1(c) and 1(d), respectively) confirmed the introduction of the vinyl group in the silica-based aerogel structure.

In the $^{29}$Si NMR spectra from the TEVS-WG aerogel, five peaks were observed at chemical shifts of −72.64 ppm (T2), −81.85 ppm (T3), −92.22 ppm (Q2), −102.20 ppm (Q3) and −112.56 ppm (Q4). Peaks assigned as T3 and T2 are derived silicon with three and two Si—O—Si bridges and one organic group, so their presence confirmed the incorporation of the vinyl group in the silica network of the TEVS-WG aerogel by comparison with known chemical shift values (cf. Refs. 1 and 2 provided below).

Significant differences were observed in the $^{29}$Si NMR spectra of the TEVS-WG aerogel product in comparison with those of conventional waterglass-based silica aerogels (i.e. with no TEVS functionalization), and also compared to prior art TEOS-based silica aerogels. To further illustrate this point, a waterglass-based silica aerogel sample (hereinafter referred to as 'reference WG aerogel' sample) and a TEOS-based silica aerogel sample (hereinafter referred to as 'reference TEOS aerogel' sample) were prepared according to known methods (see synthesis description below) for comparative purposes, of which $^{29}$Si NMR spectra are shown in FIGS. 1(a) and 1(b), respectively. In both cases, three peaks which correspond to the presence of two (the lowest intense peak), three and four Si—O—Si bridges could be observed. In particular, three peaks at chemical shifts of −103.94 ppm (Q2), −108.69 ppm (Q3) and −117.83 ppm (Q4) could be observed in the $^{29}$Si-NMR spectrum of the reference WG aerogel sample (FIG. 1(c)).

On the other hand, the peaks observed in the $^{13}$C-NMR spectra (FIG. 1(d)) of the TEVS-WG aerogel product obtained according to the process of the invention, at chemical shifts between 125 to 145 ppm, can be assigned to the double carbon bond of the vinyl group, thus confirming the introduction of this functional group in the final aerogel product.

Synthesis of the Reference WG Aerogel Sample:
53.66 g of waterglass (commercial waterglass with a 26.09 wt % of $SiO_2$) were mixed with 200 g of distilled water. This mixture was left stirring for 5 minutes at room temperature. Then, this mixture was added rapidly over 300 ml of ionic exchange Amberlite® IR120 H resin and left stirring for 5 minutes. The resulting mixture was filtered to obtain the aqueous silicic acid solution.

The pH value of the resulting aqueous silicic acid solution (sol phase), which was 2.2, was adjusted with a 0.5M $NH_4OH$ solution up to a pH value of 4.5 to form a gel, and the resulting gel was aged in the presence of water at 60° C. during 24 hours to strengthen the silica network.

Solvent exchange with ethanol was then performed four times, and the resultant gel phase was dried under $CO_2$ supercritical conditions (i.e. 50° C. and 130 bars), thus leading to the formation of the aerogel final product.

Synthesis of the Reference TEOS Aerogel Sample:
188.4 g of isopropanol were mixed with 12.4 g of distilled water. 223.92 g of tetraethoxysilane (Aldrich) were added over the mixture. Then, 8 ml of HCl 0.1M solution was added reaching a value of pH 3. The resulting solution was kept under constant stirring at 60° C. during 1.5 hours. After this time, the solution was left during 20 minutes until room temperature was reached.

Then, 48 ml of $NH_4OH$ 0.5M solution were added reaching a value of pH equal to 10 and the solution was left stirring for 1 minute. After this time, the gel was formed (gelation time was 30 minutes).

The resulting gel was aged in the presence of the aging solution composed of 2 g of $H_2O$, 120 g of IPA, and 2.6 g of $NH_4OH$ 20.5%) at 60° C. during 48 hours to strengthen the silica network.

Solvent exchange with isopropanol was then performed 4 times, and the resultant gel phase was dried under $CO_2$ supercritical conditions (50° C. and 130 bars), thus leading to the formation of an aerogel final product.

REFERENCES

1—A. Borba, J. P. Vareda, L. Durães, A. Portugal, P. N. Simões; New J. Chem. 2017, 41, 6742-6759.
2—D. A. Loy, B. M. Baugher, C. R. Baugher, D. A. Schneider and K. Rahimian; Chem. Matter. 2000, 12, 3624-3632.

Fourier-Transform Infrared Spectroscopy (FTIR)

TEVS-WG aerogel obtained according to the process of the invention as exemplified in Example 1 was characterized by FT-IR (FIG. 2(b)), and its IR spectra was compared to that of the reference waterglass aerogel sample which was prepared as described above (FIG. 2(a)). IR spectra were recorded in a Spectrum 100 instrument (Perkin-Elmer), employing 8 scans with 4 $cm^{-1}$ resolution. Samples were prepared by mixing them with KBr and preparing a pellet.

Firstly, FIG. 2(b) showed a reduction in the intensity of the —OH absorption bands around 3500 and 1650 $cm^{-1}$ compared to the intensity of the —OH absorption bands observed in the IR spectrum of the reference waterglass aerogel sample (FIG. 2(a)), which was indicative of the presence of a lower number of free Si—OH groups on the surface due to their functionalization with TEVS.

More importantly, the IR spectrum which is shown in FIG. 2(b) confirmed the vinyl group incorporation in the silica network, since the characteristic vibrations were present; for example, at 1600 $cm^{-1}$ ($v_{C=C}$ bond stretching).

Field Emission Gun Scanning Electron Microscopy (FEG-SEM)

TEVS-WG aerogel was further characterized using a high-resolution field emission microscope Jeol JSM-7000F with Wolfram filament. It has a beam voltage of 300V-30 kV and a resolution of 1.2 nm. The samples were supported on a carbon tape and coated with chromium.

FIGS. 3(a) and (b) respectively show SEM images of a reference WG aerogel which was prepared as described above, and a TEVS-WG aerogel prepared according to the process of the invention. In both cases, a three-dimensional network structure consisting of nanoscale aggregates of primary particles and nanoscale pore sizes could be observed. Samples did not display significant differences in terms of the microstructure morphology of the three-dimensional network, confirming that vinyl group presence did not modify in a noticeable way either the porosity or the morphology of the silica network.

Example 2—Tests of Physical Properties of a TEVS-WG Aerogel Obtained According to the Process of the Invention and a Conventional Waterglass-Based Silica Aerogel Several physical parameters (i.e. apparent density, specific surface area (SSA) by BET analysis, porosity, pore size and thermal conductivity) were measured using the following samples:

Sample 1: TEVS-WG aerogel from Example 1 prepared according to the process of the invention;
Reference WG aerogel sample, which was prepared as described in Example 1.

The apparent density of each aerogel sample was calculated by measuring the mass to volume ratio.

The specific surface area of each aerogel sample was determined by nitrogen sorption isotherms with standard Brunauer-Emmett-Teller (BET) analysis (ASAP 2020, Micromeritics Instrument Corporation, USA).

The porosity of each aerogel sample was calculated using the following formula:

$$\text{Porosity} = (1 - \rho a/\rho s) \times 100 (\%)$$

where ρa is the apparent density of aerogel and ρs is the skeleton density of the aerogel. The ρs of silica aerogels was measured by Helium pycnometer.

Textural properties were investigated by the standard $N_2$ gas adsorption method using a surface area analyzer (MICROMERITICS ASAP 2020, USA). Initially, the samples were degassed at 120° C. for twenty hours and the adsorption-desorption isotherms were obtained at 77 K. The specific surface area was calculated using the standard Brunauer-Emmett-Teller (BET) method. BET analysis from the amount of $N_2$ gas adsorbed at various partial pressures ($0.05 < p/po < 0.3$) was used to determine the surface area. Pore size distributions (PSD) were estimated by the Barrett-Joyner-Halenda (BJH) nitrogen gas adsorption-desorption method.

The thermal conductivity of each sample was measured by the Hot-Plate technique.

Results are summarized in the table below:

| Aerogel sample | Apparent Density (g/ml) | SSA BET (m²/g) | Porosity (%) | Average pore size (nm) | Thermal conductivity (W/mk) |
|---|---|---|---|---|---|
| Sample 1 | 0.118 | 863 | 95.1 | 15.7 | 0.015 |
| Reference WG aerogel sample | 0.121 | 873 | 93.9 | 19.2 | 0.016 |

It was surprisingly found by the inventors that the present process afforded the introduction of vinyl groups in a silica aerogel network without significantly affecting the silica-based aerogel properties.

Example 3—Tests of Gelation Time of TEVS-WG Aerogels Obtained According to the Process of the Invention Under Different Sol-Gel Conditions Eight different samples of TEVS-WG aerogels were prepared according to the general process of the invention but with varying amounts of wt. % of $SiO_2$ and/or varying amounts of wt. % of $SiO_2$ resulting from the TEVS hydrolysis, wt. % of $SiO_2$ resulting from the silicic acid solution (waterglass solution), and/or under different pH conditions. Gelation time of each one of them was measured experimentally.

Results obtained are summarized in the table below:

| Experiment Nr. | % $SiO_2$ from waterglass solution† | % $SiO_2$ from hydrolyzed TEVS | Total % $SiO_2$ | pH (sol-gel) | Gelation time (min) |
|---|---|---|---|---|---|
| 1 | 7.0 | 0 | 7.0 | 4.5 | 15 |
| 2 | 7.0 | 0 | 7.0 | 5.0 | 5 |
| 3 | 6.0 | 0 | 6.0 | 5.0 | 10 |
| 4 | 5.0 | 4.5 | 9.5 | 5.5 | 10 |
| 5 | 5.7 | 3.7 | 9.5 | 5.0 | 25 |
| 6 | 6.0 | 3.0 | 9.0 | 4.5 | 60 |
| 7 | 6.0 | 3.0 | 9.0 | 5.0 | 20 |
| 8 | 3.0 | 6.0 | 9.0 | 5.0 | 45 |

†Silicic acid aqueous solution.

The table shows that gelation time decreased with higher pH values (see entries 1 and 2 in the table). It was also observed that when the rest of conditions were kept invariable, those samples with a wt. % $SiO_2$ resulting from TEVS hydrolysis higher than the wt. % $SiO_2$ resulting from the waterglass solution (silicic acid solution) experienced longer gelation times.

On the other hand, when the system only contained $SiO_2$ resulting from waterglass (silicic acid solution), as the $SiO_2$ concentration increased, gelation time decreased (see examples 2 and 3 of the table above). This is in contrast with the results observed by the inventors when a waterglass-TEVS aerogel prepared according to the invention was used. In that case, when experiments 3 and 7 were carried out, under identical conditions in terms of the $SiO_2$ concentration resulting from waterglass (silicic acid solution), it was found that an increase in the $SiO_2$ concentration resulting from hydrolyzed TEVS resulted in a longer gelation time.

Example 4—Tests of Gelation Time of a TEVS-WG Aerogel Obtained According to the Process of the Invention and a Comparative TEVS-TEOS Aerogel It is provided herein a table wherein the gelation time of a TEVS-WG aerogel sample (Sample 1), which was prepared according to the process of the invention as exemplified in Example 1, is compared to that of a TEVS-functionalized TEOS-based silica aerogel product (hereinafter referred to 'Reference TEVS-TEOS aerogel sample') prepared according to the known process disclosed in Cui et al. (*Current Nanoscience* 2012, 8, 797-800).

One of the most significant differences between both preparation methods is that the one disclosed in Cui et al. is based on mixing the two co-precursors at the same time and then subjecting them to hydrolysis, whereas the process of the present invention is based on the independent hydrolysis of the vinylalcoxysilane and the ion-exchange of a waterglass solution, wherein the resulting solutions (i.e. the hydrolyzed vinyltrialcoxysilane solution and the silicic acid solution, respectively) are then subject to gelation.

TEVS-WG aerogel sample 1 was prepared according to the process of the invention, and thus included waterglass and TEVS as co-precursors, whereas the Reference TEVS-TEOS aerogel sample prepared according to Cui et al. was based on the use of TEOS and TEVS as co-precursors. For comparative purposes, the same molar ratio value of 0.5 was used for sample 1 (i.e. TEVS/($SiO_2$ from silicic acid solution)=0.5) and for the Reference TEVS-TEOS aerogel sample (i.e. TEVS/($SiO_2$ from TEOS hydrolysis)=0.5).

Results obtained are indicated in the table below:

| | Precursor 1 | Precursor 2 | TEVS/ $SiO_2$ molar ratio | Sol-gel reaction | | Gelation time (h) |
|---|---|---|---|---|---|---|
| | | | | Solvent | Catalyst | |
| Sample 1 | Waterglass | TEVS | 0.5 | $H_2O$ | $NH_4OH$ (0.5M) | 1 |
| Reference TEVS-TEOS aerogel sample | TEOS | TEVS | 0.5 | EtOH | $NH_4OH$ (1M) | ~50 |

It can be concluded from these experimental results that when similar sol-gel reaction conditions were used, the gelation time of a TEVS-WG system (Sample 1 prepared according to the invention) turned out to be significantly shorter than that of an equivalent TEVS-TEOS system.

Without wishing to be bound by theory, it is postulated that under the conditions of the method of Cui et al., there exists a competition between TEOS and TEVS hydrolysis reactions which eventually has a detrimental effect in subsequent gelation rates.

Such experimental results evidence another advantageous effect of the invention, that is, that shorter gelation times are obtained with the TEVS-functionalized waterglass-based silica aerogels of the invention, compared to known waterglass-based silica aerogels functionalized with other silicon alcoxides such as TEOS.

The invention claimed is:

1. A process for preparing waterglass-based silica aerogels, wherein the process comprises:
   (a) subjecting a certain amount of a vinyltrialcoxysilane to hydrolysis in the presence of water and an inorganic acid under stirring conditions to produce a hydrolyzed vinyltrialcoxysilane solution;
   (b) treating a waterglass solution with an acidic cationic-exchange resin to produce a silicic acid solution;
   (c) forming a sol phase by contacting the hydrolyzed vinyltrialcoxysilane solution with the silicic acid solution;

(d) forming a gel phase by adjusting the pH of the sol phase to a value in the range of from 4 to 6; and (e) subjecting the gel phase to supercritical drying at a temperature in the range from 31° C. to 70° C. to produce an aerogel wherein, prior to the supercritical drying of the gel phase of step (e) takes place, the water is exchanged with an organic solvent, and wherein step (a) is carried out by first adding the vinyltrialcoxysilane over water, and then adding the inorganic acid.

2. The process according to claim 1, wherein the stirring conditions in step (a) comprise a stirring speed in the range of from 250 to 1000 rpm.

3. The process according to claim 1, wherein the inorganic acid is selected from the group consisting of sulphuric acid, phosphoric acid, nitric acid, hydrofluoric acid, hydrochloric acid and any mixture thereof.

4. The process according to claim 1, wherein the waterglass solution is a waterglass aqueous solution comprising a 9 to 25% by weight solution of sodium or potassium waterglass, or both.

5. The process according to claim 1, wherein the acidic cationic-exchange resin has a poly(styrene-divinylbenzene) matrix functionalized with sulfonate groups or a poly(styrene-divinylbenzene) matrix functionalized with sulfonic acid groups.

6. The process according to claim 1, wherein the sol phase in step (c) comprises an amount in the range from 6 to 9.5% by weight of $SiO_2$.

7. The process according to claim 1, wherein the pH of the sol phase in step (d) is adjusted to a value in the range of from 4.0 to 5.5.

8. The process according to claim 1, wherein, prior to step (e), the gel obtained in step (d) is aged in the presence of water for a period equal to or higher than 24 hours at a temperature in the range of 40 to 70° C.

9. The process according to claim 1, wherein the vinyltrialcoxysilane is selected from the group consisting of trim ethoxyvinyl silane, triethoxyvinylsilane, tripropoxyvinylsilane, tributoxyvinylsilane, tripentoxyvinylsilane and tris($\beta$-methoxyethoxy) vinylsilane.

10. The process according to claim 1, wherein the resulting aerogel from step (e) is functionalized through a reaction with a vinyl monomer.

* * * * *